United States Patent

[11] 3,612,134

[72] Inventor Franz Minarik
 18, Leniengasse, Vienna, 6, Austria
[21] Appl. No. 875,840
[22] Filed Nov. 12, 1969
[45] Patented Oct. 12, 1971

[54] ROLLER WHEEL
 2 Claims, 2 Drawing Figs.
[52] U.S. Cl. .................................................. 152/9, 295/12
[51] Int. Cl. ......................................................... B60b 9/22
[50] Field of Search ............................................ 152/9; 295/12

[56] References Cited
UNITED STATES PATENTS

| 1,295,664 | 2/1919 | Woods | 152/9 |
| 1,801,664 | 4/1931 | De Cloud | 295/12 |

*Primary Examiner*—Arthur L. La Point
*Assistant Examiner*—D. W. Keen
*Attorney*—Imire & Smiley ABSTRACT: A roller wheel which comprises a wheel hub, a tread ring, which is radially movable relative to the wheel hub, a pneumatic tire, which is disposed between said tread ring and said wheel hub, and two discs, which cover the sides of the roller wheel and one of which is integral with the wheel hub.

PATENTED OCT 12 1971 3,612,134

INVENTOR

FRANZ MLNARIK

BY Imirie, Smiley, Snyder & Butrum

ATTORNEYS

ROLLER WHEEL

BACKGROUND OF THE INVENTION

It is known to provide roller wheels with a tread ring, which carries the tread and is radially displaceable relative to the wheel hub, and with two discs which laterally cover the roller wheel, whereas the tread ring is backed by a pneumatic tire which surrounds the wheel hub.

The known roller wheels of that kind comprise relatively complicated joints for the two discs. A bolt and nut assembly has been employed, which extends through the roller wheel and has a bolt head and a nut which engage the outside surfaces of respective discs. Such a structure requires through bores in the tread ring or in the wheel discs. The provision of such bores involves difficulties in the manufacturing and assembling operations as well as portions which are weak and subjected to wear.

Roller wheels for use on rails have been disclosed, which are provided with a pneumatic tire disposed within a tread drum, which is a pressed or forged member provided with the wheel flange and is detachably connected to the wheel body. This assembly is complicated in structure and has the great disadvantage that the wheel flange follows the radial motion of the assembly provided with the tread and can also yield in an axial direction so that the guidance of the wheels on rails is less satisfactory.

SUMMARY OF THE INVENTION

A roller wheel which comprises a solid tread ring, which carries the tread and is radially displaceable relative to the wheel hub, backed by the wheel body with a pneumatic tire interposed, and extends into the space between two axially spaced apart discs, which are provided with axially protruding extensions engaging recesses in the side faces of the tread ring and limiting the radial movement of the tread ring. The wheel hub is integral with one of the two discs.

A roller wheel according to the invention avoids the disadvantages of the known roller wheels and ensures a highly reliable performance, it can be used for both road and rail vehicles, and it can be manufactured in a simple manner and enables smooth travel of the vehicle.

DETAILED DESCRIPTION OF THE INVENTION

Figure 1:
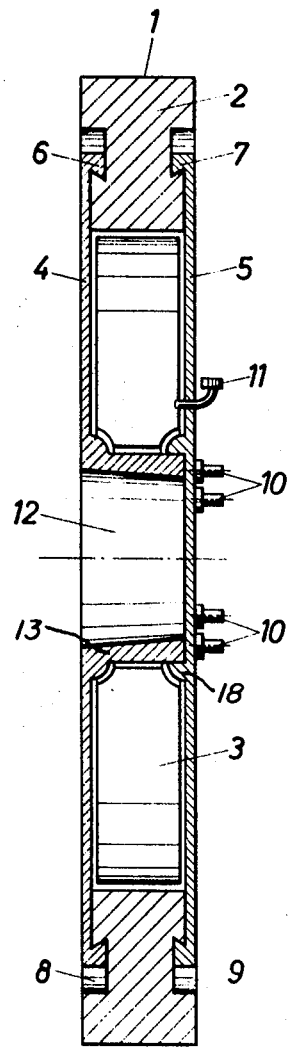
FIG. 1 is a cross-sectional view taken diametrically through a roller wheel according to the invention for a road vehicle.

The drawing shows a roller wheel having a tread 1, which is formed on a solid tread ring 2, which is radially displaceable relative to the wheel body and backed by the wheel body with a pneumatic tire 3 interposed. The tread ring is radially displaceable because it consists of solid rubber, a synthetic elastomer, or the like so that it can yield inwardly when the pressure in the pneumatic tire has decreased.

The tread ring 2 enters the space between two axially spaced apart discs 4, 5, which are mounted on the wheel body constituted by a hub 13. In the embodiment shown in FIG. 1, the discs 4, 5 are provided with axially inwardly protruding extensions 6, 7, which enter recesses 8, 9 in the side faces of the tread ring 2 and limit the radial movement of the solid tread ring 2. An inflating valve 11 extends outwardly through the disc 5 and serves to inflate the pneumatic tire 3.

The extensions 6, 7 axially protruding from the discs 4, 5 are profiled or relieved in the shape of a hook. The disc 4 is integral with the wheel body 13, which has a bore 12 for receiving the axle bearing. The disc 5 is detachably secured to the wheel body 13 by eight screws 10, only four of which are indicated in the drawing by their center lines.

A ring 18 which protrudes from the inside of the disc 5 surrounds the free end of the wheel hub 13 and guides the latter. The disc 4 may be integral with the hub 13.

The recesses 8, 9 in the side faces of the solid rubber ring 2 consist of annular grooves.

Figure 2:
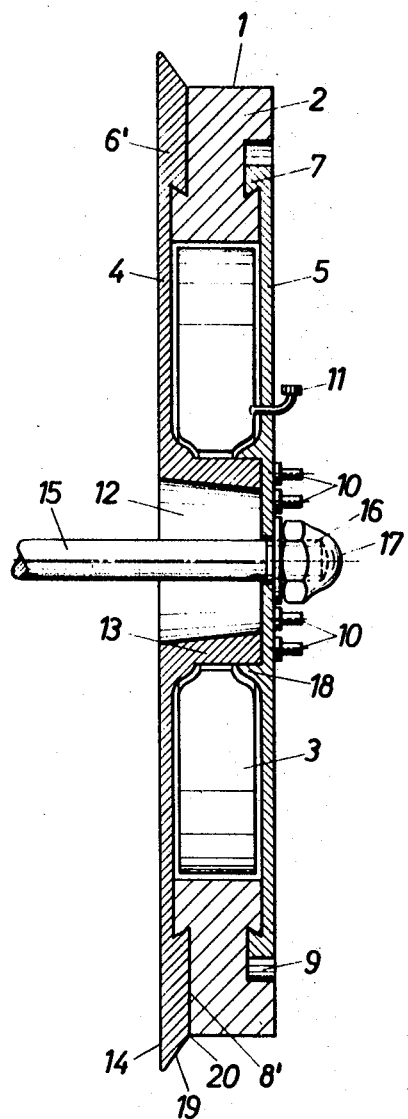
FIG. 2 is a similar cross-sectional view of a roller wheel for a rail vehicle.

In the roller wheel shown in FIG. 2 and intended for use on rails, the inner disc 4 is integral with the wheel hub 13, which is formed with the bore 12 for receiving the axle bearing. The disc 4 extends radially beyond the tread ring 2 so that its outwardly protruding rim forms a wheel flange 14 and for this purpose is outwardly beveled at an angle of about 45°. The tread ring 2 forms the wheel tire and may consist of metal or of the same material as the ring of the first embodiment. The fact that the flange 14 is integral with the disc 4 facilitates the manufacture of the wheel.

Rather than with a recess 8, the surface facing the disc 4 has an inwardly offset portion 8', which only in the outermost position of the tread ring 2 is engageable by a complementary extension 6', which corresponds to the extension 6. In this position, the beveled surface 19 of the flange 14 should extend approximately from the inner lower edge 20 of the tread ring 2.

All other parts of the tread ring shown in FIG. 2 correspond to the parts which have been described with reference to FIG. 1 and are provided with the same reference characters.

To put the roller wheel into condition for operation, it is sufficient to inflate the pneumatic tire to such an extent that the extensions 6 or 6' and 7, which have a dovetail profile on the inside or are profiled or relieved in the shape of a hook engage the complementary end of the recess 8 or of the inwardly offset portion 8'.

As in the roller wheel of FIG. 1, the disc 5 is secured to the wheel hub 13 by eight screws 10, only four of which are indicated in the drawing. The wheel axle 15 extends through the disc 5 and is provided at its end with a screw thread 16, with which a cap nut 17 is engaged.

In both embodiments of the roller wheel, longitudinal or transverse strips may be inserted in the tread 1 of the tread ring 2.

What is claimed is:

1. A roller wheel comprising two axially spaced discs one of which constitutes the front wall and the other of which constitutes the back wall of the wheel, a wheel hub integral with said latter disc and abutting said front wall disc and constituting a spacer therebetween, means releasably attaching said front wall disc to the abutting end of said hub, a ring on the inner side of said front wall disc surrounding the free end of said hub to align said discs, a pneumatic tire mounted around said hub between said discs, an outer solid tire mounted around the periphery of said pneumatic tire for limited free movement in the radial direction and having its sides respectively at least partially overlapped by the peripheral portions of said discs and radially moveable therebetween, said solid tire having annular recesses in its sidewalls, and rims on the inner sides of the outer edge portions of said discs and engaging in said recesses to limit the radial movement of said solid tire.

2. A roller wheel as set forth in claim 1, wherein the disc which is integral with the wheel hub radially protrudes beyond the tread ring to form a flange.